Nov. 14, 1944.    B. N. WALLIS    2,362,951
PRESSURE-TIGHT CABIN FOR AIRCRAFT
Filed June 17, 1942
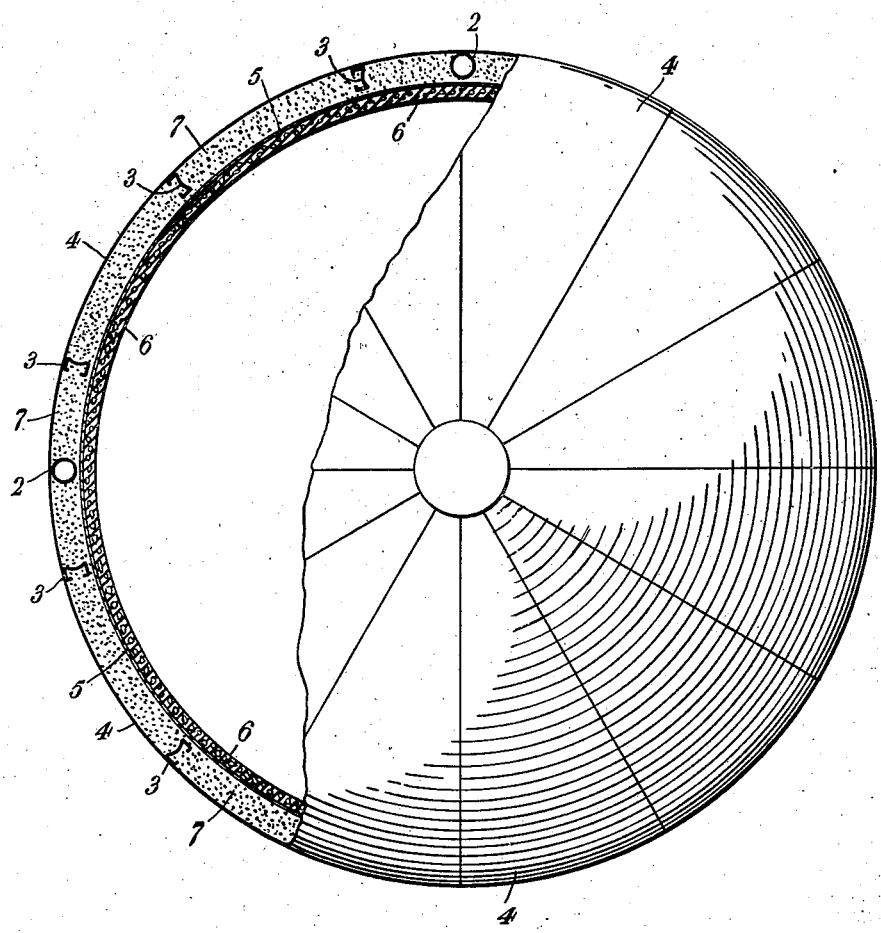

Patented Nov. 14, 1944

2,362,951

UNITED STATES PATENT OFFICE 2,362,951

PRESSURE-TIGHT CABIN FOR AIRCRAFT

Barnes Neville Wallis, Weybridge, England, assignor to Vickers-Armstrongs Limited, London, England Application June 17, 1942, Serial No. 447,403
In Great Britain April 8, 1941

5 Claims. (Cl. 244—119)

The operation of aircraft at extremely high altitudes for prolonged periods presents certain problems not encountered when flying is restricted to altitudes less than, say, 15,000 to 25,000 feet above sea level, owing to the physiological effects of high altitude and the accompanying low atmospheric pressure and deficiency of oxygen. It has been proposed to surmount these difficulties by the use of a sealed pressure-tight cabin in which the air is maintained at a pressure sufficiently in excess of the atmospheric pressure at flying height to enable the aircraft personnel (and the passengers, in the case of an air liner or the like) to remain physically unaffected at the altitude at which the aircraft is flown.

One proposed form of such cabin comprises an external pressure-tight skin internally lagged with heat-insulating material, said skin consisting of a sheet metal casing which encloses the structural framework of the fuselage, but such an arrangement is disadvantageous for the reasons—

(a) That the skin is difficult to fabricate, since for economy of weight it must be made of light gauge sheet, and the difficulty of joining panels of sheet material of high mechanical properties is well known; and (b) That the skin is difficult to maintain in pressure-tight condition, particularly in the case of military aircraft which may be subjected to penetration by bullets or shell fragments. The presence of the lagging on the interior of the metal skin would prevent the repair of punctures by bullets or the like, so that the augmented pressure within the cabin would be lost very rapidly, and in any case the jagged rent made by a bullet on exit would be completely irreparable during flight. Self-sealing materials, such as cellular rubber, could not be used to line the external skin since the intensely cold conditions prevailing at stratospheric altitudes are known to render such sealing materials brittle and ineffective.

With the object of overcoming all these difficulties, the present invention proposes to construct a pressure cabin for the said purpose with an airtight inner wall or membrane supported against the structural members, an outer fabric or other envelope, the space between said inner wall and the outer envelope being packed with heat-insulating material, and an interior lining of a suitable puncture-sealing material upon said inner wall or membrane.

One embodiment of the invention is illustrated diagrammatically by way of example in the accompanying drawing, which is a partly sectional end elevation of a pressure cabin for a high altitude aircraft, the fuselage structure of which is fabricated on the geodetic principle described in British patent specifications Nos. 388,438, 452,726 and 494,233. In said drawing the longerons are indicated conventionally at 2, 2, and the geodetic frame-members at 3, 3. The numeral 4 indicates the outer fabric envelope which encloses the geodesics 3.

The inner wall of the cabin, indicated at 5, conveniently consists of a fabric, woven from warps of high-tensile steel wire and textile weft threads, and which is laid upon the inner faces of the frame-members 3 with the steel warps disposed circumferentially of the structure so that they are adapted to resist the hoop stress imposed upon the inner wall 5 by a high internal cabin pressure. In a modification, the fabric 5 may be arranged with the steel warps disposed longitudinally of the structure, the hoop stress in this case being resisted by the circumferential frame-members or the outer metal skin.

It may be mentioned by way of example that in one construction of pressure cabin it is proposed to use for the inner wall 5 a fabric in which steel wire warps of 37 S. W. gauge, having a tensile breaking strength of 120 tons per square inch, are woven 28 ends to the inch width. The textile weft threads serve merely to position the steel warps and may be woven at 80 to 100 picks per inch run. It will however be understood that the strength of the wire warps and the number of ends woven per inch width may be modified to suit different conditions.

The cabin is rendered substantially airtight by applying to the interior face of the inner wall 5 a thin coating of pure rubber latex or other suitable material. The coated wall 5 is then made self-sealing against puncture by bullets or other missiles by lining it with an interior layer 6 of cellular rubber in sheet form; this is secured upon the coated inner face of the wall 5 by means of indiarubber solution. The cellular rubber lining 6 is of sufficient thickness to seal any small punctures which may be made in it, the internal air pressure of the cabin being so much higher than that of the external atmospheric pressure that the lips of a puncture made in the lining 6 tend to be closed over the orific automatically. Large punctures which are incapable of being adequately sealed automatically can easily be repaired by patching the rubber lining 6 upon the inside of the cabin.

The spaces surrounding the structural members 2 and 3, and between the outer envelope and the inner wall 5, are packed with wool noils or other appropriate heat-insulating material, as indicated at 7. This precaution ensures that the aircraft personnel or passengers are protected from exposure to the intense external cold which is experienced when flying at high altitudes and similarly protects the rubber coating upon the inner face of the wall 5 and the rubber sealing material 6 from deterioration by cold so that the airtightness and self-sealing qualities of the cabin wall remain unimpaired at all altitudes.

It will be understood that in the case of a stressed-skin structure the inner wall 5 is supported by the longitudinal stringers or circumferential frames, the space between said inner wall and the outer metal skin (which in this form of structure takes the place of the envelope 4) being lagged with heat-insulating material.

In a modification within the principle of the invention, it is proposed to utilise for the inner wall of the cabin a flexible fabric of all-textile manufacture suitably rubberised or otherwise treated to make it airtight, and supported at intervals by spaced circumferential wires carried by the frame members of the structure. Alternatively the wires may be arranged longitudinally.

It will thus be seen that the constructional arrangement of the pressure cabin proposed by the invention enables all the aforementioned difficulties to be avoided; it is possible to maintain the cabin pressure-tight when supercharged internally, even when subjected to damage by gunfire; the structure is of light weight and simple to manufacture, and for a given size of cabin utilising a geodetic structure, a high economy of weight is achieved as compared with the type incorporating an external metal skin.

What I claim as my invention and desire to secure by Letters Patent is:

1. A pressure cabin for aircraft, comprising a structural frame, an airtight inner wall supported against said frame, said wall comprising a fabric woven from high tensile steel warps and textile weft threads, an outer envelope enclosing the whole, heat-insulating material filling the space between said inner wall and said envelope, and an interior layer of puncture-sealing material lining said inner wall.

2. A pressure cabin for aircraft as claimed in claim 1, wherein the steel warp components of the inner wall are disposed circumferentially of the cabin and adapted to resist hoop stress imposed upon the inner wall.

3. A pressure cabin for aircraft as claimed in claim 1, wherein the steel warp components of the inner wall are disposed longitudinally of the cabin, and wherein hoop stress imposed upon said inner wall is supported by the structural frame-members.

4. A pressure cabin for aircraft as claimed in claim 1, wherein the interstices between the woven components of the inner wall are made airtight by a coating of pure rubber latex.

5. A pressure cabin for aircraft, comprising a structural frame, a plurality of spaced tensioned circumferential wires supported upon the interior of said frame, an airtight inner wall of rubberised textile fabric supported against said wires, an outer envelope enclosing the whole, heat-insulating material filling the space between said inner wall and said envelope, and an interior layer of puncture-sealing material lining said inner wall.

BARNES NEVILLE WALLIS.